US010620807B2

(12) United States Patent
VanBlon et al.

(10) Patent No.: US 10,620,807 B2
(45) Date of Patent: Apr. 14, 2020

(54) ASSOCIATION OF OBJECTS IN A THREE-DIMENSIONAL MODEL WITH TIME-RELATED METADATA

(71) Applicant: Lenovo (Singapore) Pte. Ltd., New Tech Park (SG)

(72) Inventors: Russell Speight VanBlon, Raleigh, NC (US); David Alexander Schwarz, Morrisville, NC (US); Axel Ramirez Flores, Cary, NC (US); Suzanne Marion Beaumont, Wake Forest, NC (US); Ming Qian, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/856,222

(22) Filed: Sep. 16, 2015

(65) Prior Publication Data

US 2017/0076508 A1    Mar. 16, 2017

(51) Int. Cl.
| | |
|---|---|
| *G06T 19/00* | (2011.01) |
| *G06F 3/0484* | (2013.01) |
| *G09G 5/00* | (2006.01) |
| *H04N 13/20* | (2018.01) |
| *H04N 13/178* | (2018.01) |

(52) U.S. Cl.
CPC .......... *G06F 3/04845* (2013.01); *G06T 19/00* (2013.01); *G09G 5/006* (2013.01); *H04N 13/178* (2018.05); *H04N 13/20* (2018.05); *G06F 2203/04802* (2013.01); *G09G 2370/14* (2013.01)

(58) Field of Classification Search
None
See application file for complete search history.

(56) References Cited

U.S. PATENT DOCUMENTS

| | | | | | |
|---|---|---|---|---|---|
| 5,359,703 | A | * | 10/1994 | Robertson | G06F 3/04815 345/419 |
| 7,665,041 | B2 | * | 2/2010 | Wilson | G06F 3/017 715/860 |
| 2006/0069681 | A1 | * | 3/2006 | Lauper | G06F 17/30265 |
| 2012/0052917 | A1 | * | 3/2012 | Kim | G06F 3/04815 455/566 |
| 2013/0342525 | A1 | * | 12/2013 | Benko | H04N 13/0495 345/419 |
| 2014/0055491 | A1 | * | 2/2014 | Malamud | H04W 4/21 345/633 |

OTHER PUBLICATIONS

"Feature Detection", Wikipedia. Last updated Jun. 21, 2015. Retrieved from http://en.wikipedia.org/windex.php?title=Feature_detection_(computer_vision)&oldid=867944838.

Andrea Frome, Greg S. Corrado, Jonathon Shlens, Samy Bengio, Jeffrey Dean, Marc Aurelio Ranzato, Tomas Mikolov, "DeViSE: A Deep Visual-Semantic Embedding Model", Google, Inc. Mountain View, CA.

* cited by examiner

*Primary Examiner* — Said Broome (74) *Attorney, Agent, or Firm* — John M. Rogitz; John L. Rogitz (57) ABSTRACT

In one aspect, a device includes a processor, a camera accessible to the processor, and storage accessible to the processor. The storage bears instructions executable by the processor to receive data from the camera, establish a three-dimensional (3D) model of at least a portion of a location based at least in part on the data from the camera, identify at least one object at the location from the data from the camera, and associate the at least one object with time-related metadata.

22 Claims, 7 Drawing Sheets

| Object Type | Permanence | % chance at different position | % chance gone | Expected time present | Range of movement | Attributes |
|---|---|---|---|---|---|---|
| burger | transient | 95 | 95 | 30 min | N/A | N/A |
| soft drink | transient | 95 | 95 | 45 min | N/A | N/A |
| chair | mobile | 35 | 5 | indefinitely | 5 ft. radius around desk | black, has wheels |
| mounted TV | permanent | 1 | 1 | indefinitely | None | manufacturer name X |
| wall | permanent | 0 | 0 | indefinitely | None | light yellow color |

ASSOCIATION OF OBJECTS IN A THREE-DIMENSIONAL MODEL WITH TIME-RELATED METADATA

FIELD

The present application relates generally to association of objects in a three-dimensional (3D) model with time-related metadata.

BACKGROUND

When viewing a 3D model of a room that was generated based on images of the room taken at a previous time, some objects that are shown in the 3D model may be recognized by the viewer as being transient, which makes the 3D model of the room potentially inaccurate at the time of viewing the 3D model. The present application recognizes that the foregoing is undesirable in at least some circumstances.

SUMMARY

Accordingly, in one aspect a device includes a processor, a camera accessible to the processor, and storage accessible to the processor. The storage bears instructions executable by the processor to receive data from the camera, establish a three-dimensional (3D) model of at least a portion of a location based at least in part on the data from the camera, identify at least one object at the location from the data from the camera, and associate the at least one object with time-related metadata.

In another aspect, a method includes generating a three-dimensional (3D) model of an area and associating objects recognized from the area with metadata related to whether the objects are transient in the area.

In still another aspect, an apparatus includes a first processor, a network adapter, and storage. The storage bears instructions transferable by the first processor over a network via the network adapter and executable by a second processor for generating a three-dimensional (3D) model of an area and selectively showing, in the 3D model and in response to receipt of user input, representations of objects recognized from the area that are determined to be one or more of transient in the area and mobile in the area.

The details of present principles, both as to their structure and operation, can best be understood in reference to the accompanying drawings, in which like reference numerals refer to like parts, and in which:

DETAILED DESCRIPTION

With respect to my computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system, having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known, in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
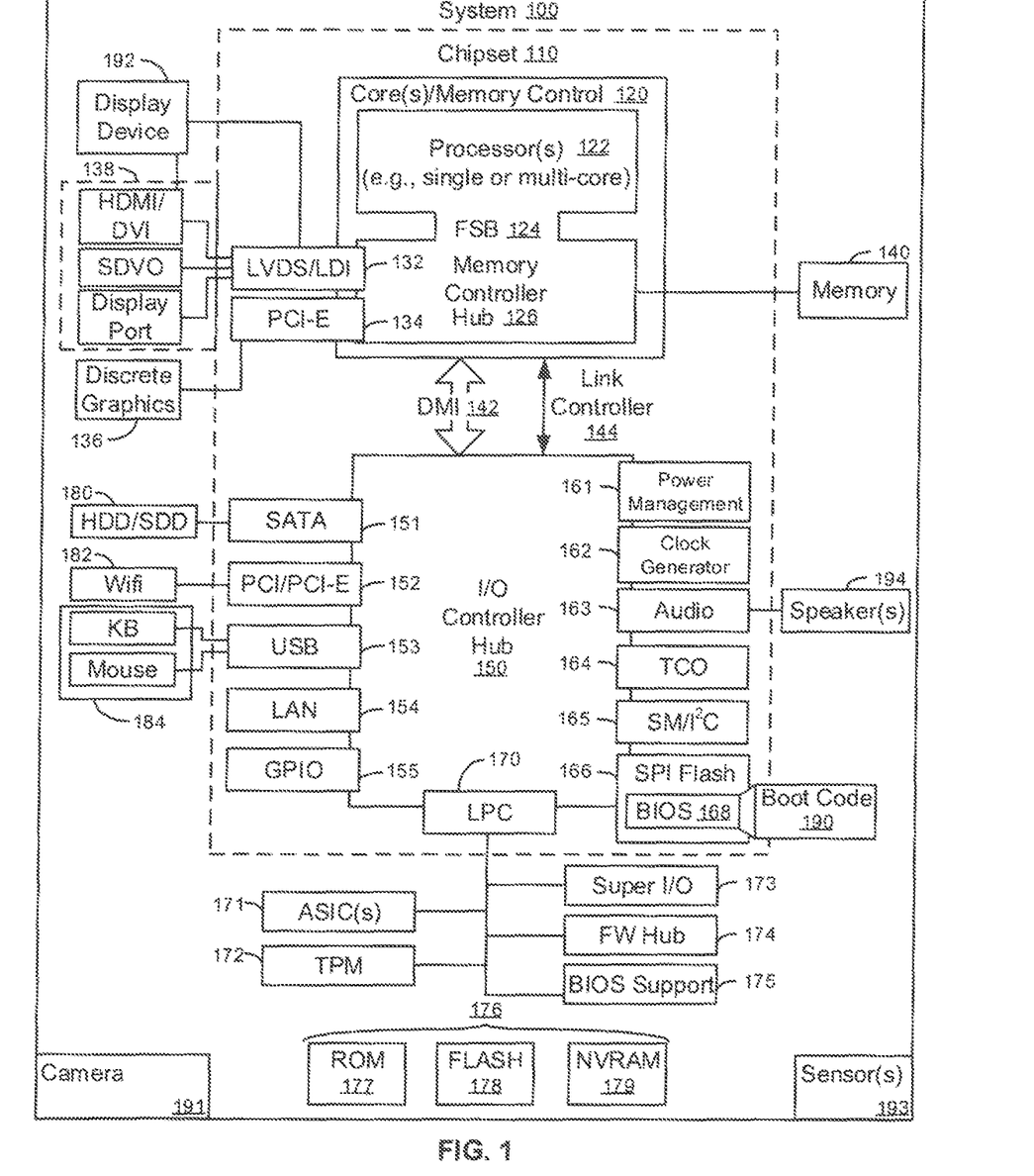
FIG. 1 is a block diagram of an example system in accordance with present principles.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northhridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multimaster serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 also includes at least one camera 191 for gathering one or more images and providing input related thereto to the processor 122. The at least one camera 191 may be a three-dimensional (3D) imaging camera configured for generating 3D images that may be used in accordance with present principles to generate 3D models. In addition to or in lieu of the foregoing, the at least one camera 191 may be a thermal imaging camera, a digital camera such as a webcam, and/or a camera otherwise integrated into the system 100 and controllable by the processor 122 to gather pictures/images (e.g., 3D images) and/or video, and/or to generate 3D models.

The system 100 may also include one or more other sensors 193 which may be used in accordance with present principles for generating 3D images and/or models. For instance, the one or more sensors 193 may comprise thermal sensors, laser scanners/rangefinders, other optical sensors besides cameras, acoustic sensors/transceivers, radar transceivers, etc.

Additionally, though now shown for clarity, in some embodiments the system 100 may include a gyroscope for sensing and/or measuring the orientation of the system 100 and providing input related thereto to the processor 122, an accelerometer for sensing acceleration and/or movement of the system 100 and providing input related thereto to the processor 122, and an audio receiver/microphone providing input to the processor 122 based on, e.g., a user providing audible input to the microphone. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

Figure 2:
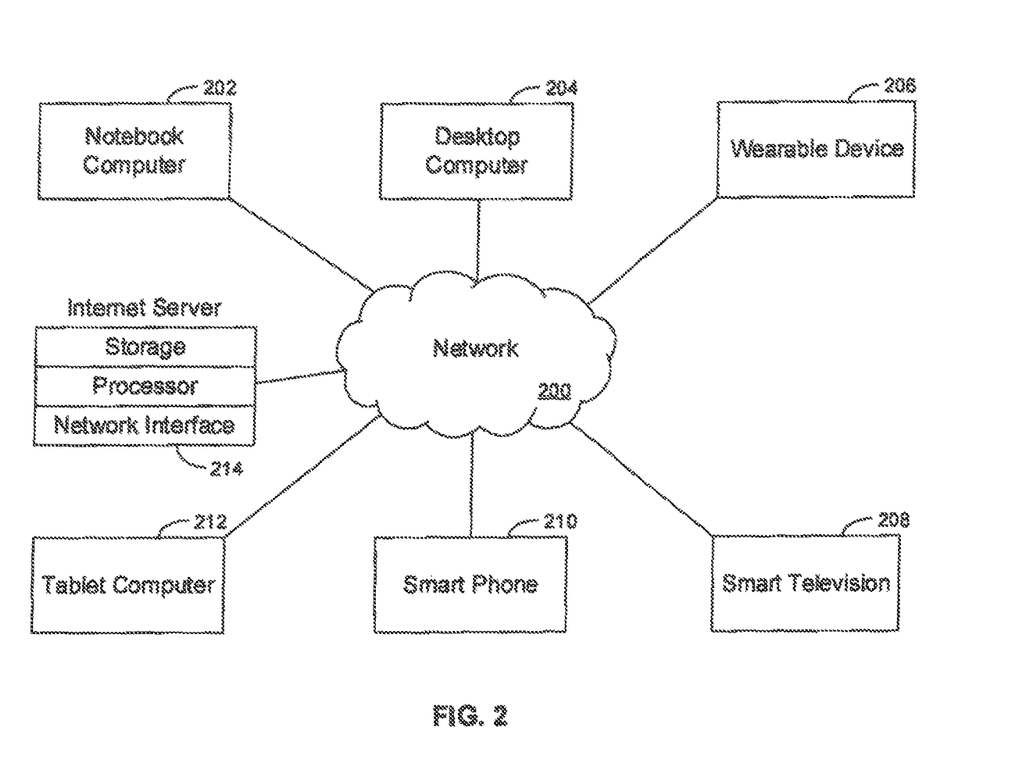
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212, it is to be understood that the devices 202-214 are configured to communicate with each other over the network 200 to undertake present principles.

Figure 3A:
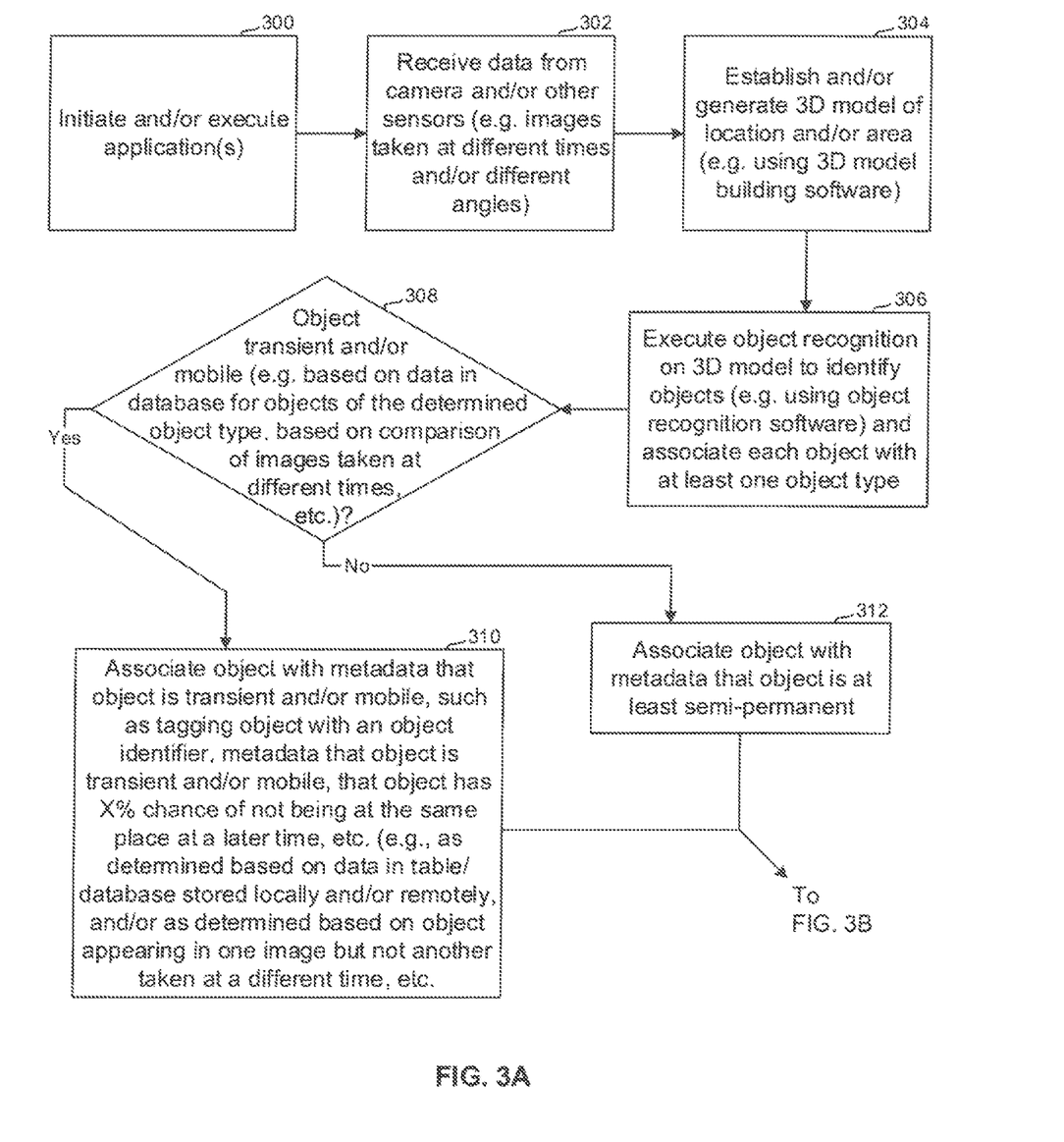
FIGS. 3A, 3B, and 4 are flow charts showing example algorithms in accordance with present principles.

Referring to FIG. 3A, it shows example logic that may be undertaken by a device such as the system 100 in accordance with present principles (referred to below as the "present device"). Beginning at block 300, the logic initiates and/or executes at least one application for undertaking present principles, such as a camera application for gathering images of a location and/or area, a three-dimensional (3D) model building application, an object recognition application (e.g., to execute a reverse image search algorithm, to perform Hough Transforms, edge/corner/blob/ridge detection, etc.), a 3D acquisition and reconstruction application, etc.

From block 300 the logic moves to block 302, where the logic receives data from one or more sensors, such as digital cameras or any of the sensors described above in reference to element 193 of FIG. 1. The data received at block 302 may include, for example, images taken at different times of day of an area and/or location, and/or images taken of the area and/or location from different angles and/or different camera points of view.

The logic then moves to block 304 where the logic establishes and/or generates a 3D model of the area and/or location based at least in part on the data received at block 302, such as using a 3D modeling application and/or other computer graphics software (e.g., Google's Project Tango) to, e.g., analyze the images (such as those taken from different angles), determine distances to items in the images from the point of view at which, the image was taken (and to determine distances between items shown in the images), and render a 3D graphical model of the area and/or location. For instance, polygonal modeling may be used, where vertices connected by line segments form a Polygon mesh presentable as a 3D model. Curve modeling and digital sculpting (e.g., dynamic tessellation, volumetric, and/or displacement methods) may also be used to generate 3D models in accordance with present principles, as may 3D lidar and parallax-related calculations performed using images of the location taken at different angles and/or positions.

Still in reference to FIG. 3A, the logic moves from block 304 to block 306, where the logic executes object recognition on the 3D model (and/or, on the data received at block 302, such as any images received) to identify objects at the area and/or location, if it has not already done so during generation of the 3D model. The logic may do so at block 306 using object recognition software, e.g., to execute reverse image search algorithms, as well as feature detection (for detecting edges, corners, blobs, ridges, etc.) and feature extraction (e.g., performing Hough Transforms) to, e.g., compare an extraction to a database of reference objects to determine what the object is based on a match of the extraction to an item in the database, etc. Visual semantic embedding models may also be used, as well as 3D lidar. But in any case, and still at block 306 responsive to recognition of objects, the logic respectively associates (e.g., tags with metadata) recognized objects with at least one object type for each object. For example, an object recognized on a desk may be associated with a lamp object type responsive to determining that the object on the desk is a lamp.

From block 306 the logic moves to decision diamond 308. At diamond 308, the logic determines whether a recognized object is transient and/or mobile. For instance, the determination may be made at diamond 308 based on data in a database and/or data table that indicates whether objects of various object types are transient, mobile, or permanent, so that whether the object is transient and/or mobile may be determined once an object type for a given object is determined at block 306.

In addition to or in lieu of that, the determination may be made at diamond 308 based on a comparison of images of the same area and/or location that were taken at different times to determine, based on the comparison, whether an object is shown in both images. Thus, if the logic determines that the object is shown in both images, the logic may determine that the object is permanent, but if it is shown in only one of the images, the logic may determine that the object transient owing to it not being present at a time at which one of the images that was compared was taken. If the object is shown in the images taken at different times but at different places within the same area, the logic may determine that the object is mobile.

Regardless, if an affirmative determination at diamond 308, the logic moves to block 310. At block 310, the logic associates (e.g., tags) the object determined to be transient and/or mobile with metadata that the object is transient and/or mobile. It may do so by, e.g., storing in the present device's storage an object image, rendering and/or object rendering data for the object, along with a unique object identifier for the object and the time-related metadata itself. The time-related metadata may be identified by accessing and parsing data in a database and/or data table such as the one referenced two paragraphs above and the one discussed below in reference to FIG. 5, where that database and/or data table may be stored in storage on the present device and/or remotely such as on a remote server or cloud storage area.

Moreover, at block 310 additional time-related metadata besides whether the object is transient and/or mobile (and still other metadata) may be associated with the object. For instance, metadata that may be associated with the object includes metadata regarding a percent chance that the transient and/or mobile object will be at a different position at a different time at the location than when the data was received at block 302, metadata regarding a percent chance that the transient and/or mobile object will be gone from the location at a different, time than when the data was received at block 302, metadata regarding the duration of time the object is expected to be at the location from when the data was received at block 302, metadata regarding an estimated and/or proximate range of movement of the object within the location, and metadata regarding attributes of the object such as object color, object texture, etc. An example data table from which these types of metadata may be identified to then associate with a particular object will be discussed below in reference to FIG. 5.

However, still in reference to block 310, also note that in addition to or in lieu of the foregoing, metadata regarding whether the object is transient and/or mobile may be associated with the object based on whether the object appeared in two or more images of the location that were taken at different times as discussed above. Thus, if an object is shown in the same place in both images, metadata may be associated with the object that the object is permanent (this may actually occur at block 312 as will be discussed further below), or at least not transient and/or readily-mobile. If the object is shown in different places in the two images, metadata may be associated with the object that the object is mobile. If the object is shown in one image but not another image or set of images from the location taken at a different time, metadata may be associated with the object that the object is transient/temporary.

Referring back to decision diamond 308, note that if a negative determination is made thereat rather than an affirmative one, the logic instead proceeds from diamond 308 to block 312. At block 312, the logic associates, as set forth herein, an object determined to be permanent (or at least semi-permanent and/or not readily-mobile) with metadata that the object is permanent (or at least semi-permanent and/or not readily-mobile). The metadata may be identified as was the transient and/or mobile object metadata discussed above (e.g., identified from a data table, identified based on images of the area taken at different times, etc.).

Figure 3B:
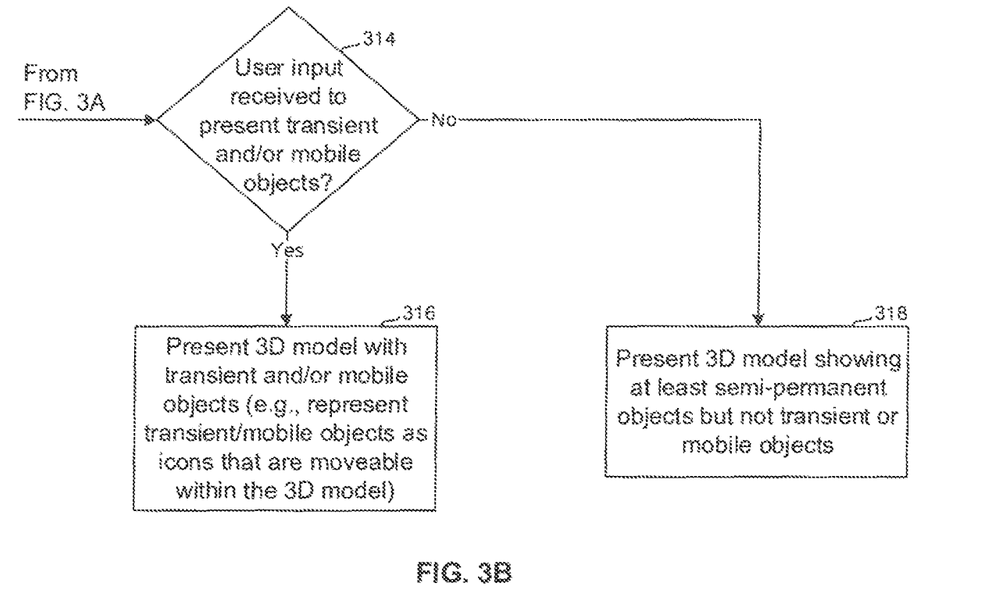

Continuing the description of the present logic, note that regardless of whether from block 310 or block 312, the logic proceeds to decision diamond 314 shown in FIG. 3B. At decision diamond 314 the logic determines whether user input has been received to present transient and/or mobile objects in a 3D model that is presented on a display of the present device and/or that will be presented. User input may be received based on manipulation of a user interface (UI) such as the one to be discussed below in reference to FIG. 7.

An affirmative determination at diamond 314 causes the logic to move to block 316 of FIG. 3B. At block 316 the logic presents a 3D model, of the location with transient and/or mobile objects shown or not shown per the user's input. The transient and mobile objects, and all objects for that matter, may in some embodiments be represented as generic icons for objects of the same object type as the transient and/or mobile objects. However, in other embodiments, actual images and/or specifically-tailored visual representations of the transient and/or mobile objects may be presented in the 3D model. In any case, the transient and/or mobile objects may be presented in the 3D model using 3D modeling software and/or any of the other software discussed above, and in some embodiments may even be moveable within the 3D model based on user input (e.g., a transient object may be selected and dragged from a desk shown in the 3D model to a coffee table shown in the 3D model, while it may be removed by dragging it out of the 3D model and/or offscreen).

Note, however, that if instead of an affirmative determination at diamond 314, a negative one is made, the logic proceeds to block 318. At block 318 the logic presents the 3D model without showing transient and/or mobile objects, such as only showing at least semi-permanent objects such as objects that are not readily mobile. "Readily mobile" as used herein may be understood to be mobile without a person having to perform manual steps before being able to remove the object from its current place, such as without unbolting the object from a surface to move the object or without knocking down a wall to move the wall.

Figure 4:
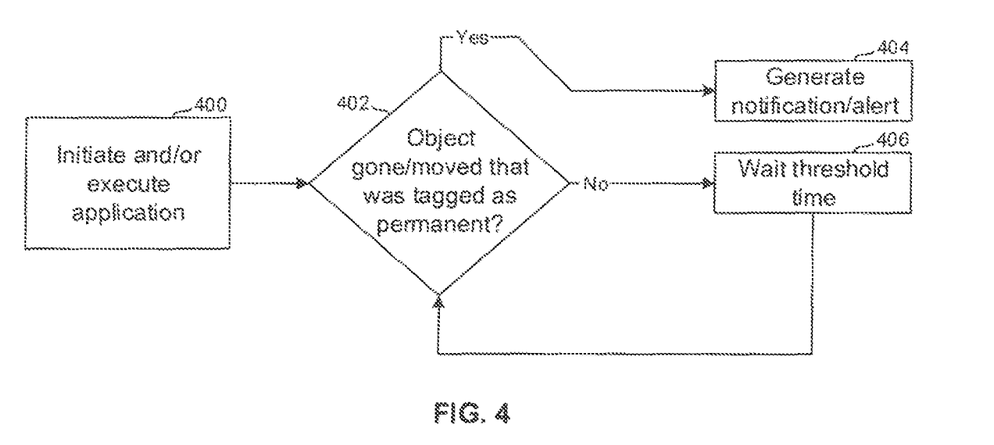

Continuing the detailed description in reference to FIG. 4, example logic is shown that may be undertaken by a device such as the system 100, it being understood that in some embodiments the logic shown in FIG. 4 may be executed in conjunction with the logic of FIG. 3. The logic of FIG. 4 pertains to notifying or alerting a user if an object which was tagged as being permanent for a location is determined at a later time based on later-taken images (e.g., from a webcam monitoring the location) to be moved or gone from the location.

Beginning at block 400, the logic initiates and/or executes at least one application for undertaking present principles, such as any of the applications discussed herein, as well as a messaging application or alert application (e.g. a text messaging application, an email application, an instant message application, etc.). The logic then moves to decision diamond 402 where the logic determines whether an object tagged as being permanent (or at least, e.g., semi-permanent) has been moved from the location and/or is no longer present at the location. Object recognition may thus be executed on images being received from a camera monitoring the location in real time to determine whether previously present objects are no longer present.

An affirmative determination at diamond 402 causes the logic to move to block 404 where, responsive to fee affirmative determination, a notification and/or alert is generated and sent to a predetermined device for viewing, such as a user's smart phone or other mobile device that may be with them at a different location. The notification/alert may be an email, a text message, a flashing-pop up message, a predetermined unique sequence of vibrations, etc. If however, a negative determination is instead made at diamond 402, the logic instead moves to block 406. At block 406 the logic waits a threshold time (e.g., configured by the user) and then returns to decision diamond 402 and proceeds therefrom.

Figure 5:
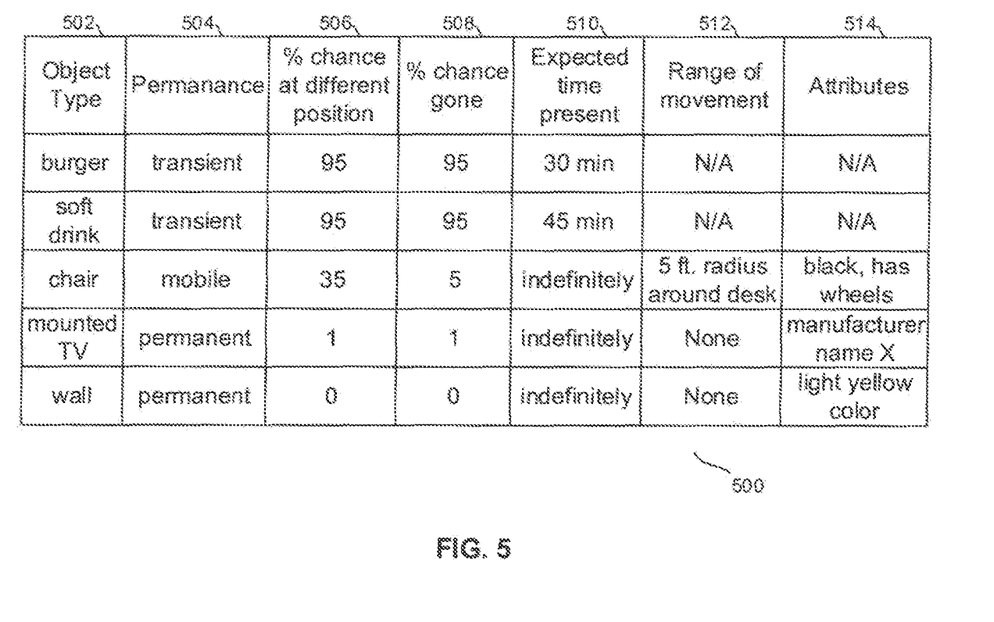
FIG. 5 is an example data table usable in accordance with present principles.

Before moving on to the description of FIG. 5, it is to be understood that logic similar to that described in reference to FIG. 4 may also be used to determine whether certain devices and room functions should be enabled, such as determining that a person is no longer present in a room and hence that an air conditioner for the room should be powered off. In such an instance, the air conditioning may be automatically powered off and a notification transmitted that it is being powered off. As another example, if permanent objects have been moved to completely different places within the location or the room otherwise left disheveled, such as if the location had been robbed, such may be determined and a notification may be transmitted that the location is in disorder and/or potentially robbed.

Reference is now made to FIG. 5. FIG. 5 shows a data table 500 that may be used in accordance with present principles for a device to determine whether an object of a determined object type is permanent mobile, or transient, and also to identify metadata to associate with the object. The table 500 includes a first column 502 listing object types and a second column 504 respectively listing, for each object type, whether the object is transient, mobile, or permanent. Thus, a device executing the logic of FIG. 3 may determine an object type as set forth above, access the data table 500, and parse the entries in column 502 until a match is made of the determined object type to an object type in one of the entries. The device may then access time-related metadata for whether the object is permanent, transient, or mobile at column 504.

Thus, for instance, suppose an orange soda has been identified from a location and determined as a soft drink object type. The device may access the table 500 and continue from the top of column 502 down the column 502 until a match for a soft drink type is made. In this case, soft drink object type is the second entry of column 502 from the top. After locating the first entry for soft drink, the device may move laterally over to an entry in column 504 associated with the soft drink object type to parse data therein and determine time-related metadata for the object, which in this case indicates that objects of the soft drink object type are transient.

Similarly, other metadata for objects of object types listed in column 502 may be identified using the table 500 and associated with particular objects as set forth herein. Continuing with the soft drink example, the logic may also identify metadata to associate with the orange soda that the object, has a ninety five percent, chance of being at a different position in the location at a different time (e.g., a threshold time, such as one day after images from which the orange soda was identified were generated and/or received) from column 506, a ninety five percent chance of being gone from the location at a different time from column 508, and a forty five minute expected time present at the location (e.g., relative to when images from which the orange soda was identified were generated and/or received) from column 510. Its expected range of movement is not applicable (e.g., owing to it being unlimited), as may be appreciated from column 512, while other attributes for the soft drink object types are also not applicable as may be appreciated from column 514.

Figure 6:
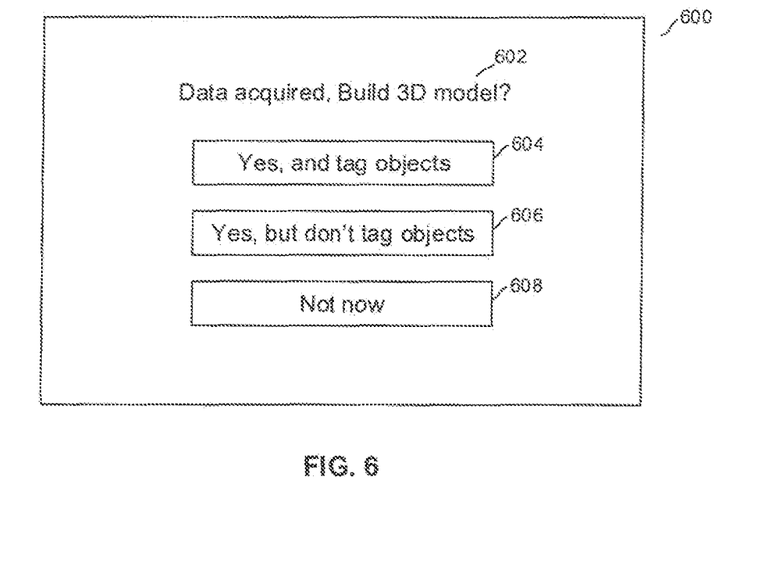
FIGS. 6 and 7 are example user interfaces (UIs) presentable on a display in accordance with present principles.
Figure 7:
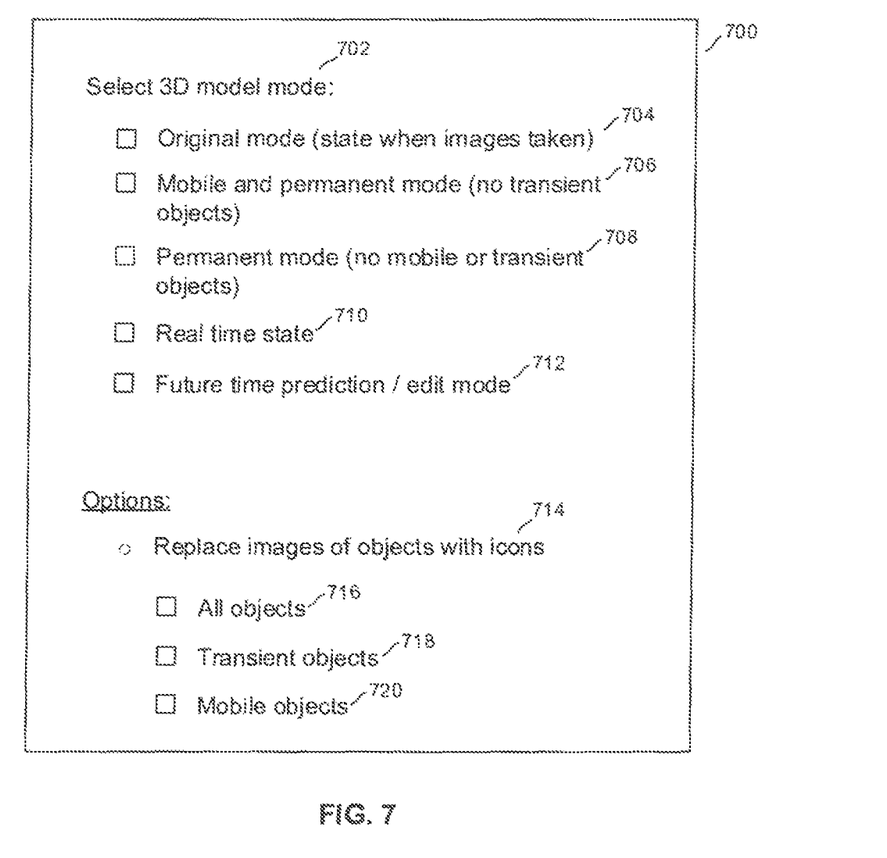

Before moving on to the description of FIG. 6, it is to be understood that the data table 500 may be established and/or populated by a developer and/or a provider of the device accessing the table 500. Also note that types of metadata (such as the types respectively shown in columns 504-514) may be selected for association with particular objects by a user based on input to selectors for each one on a user interface (UI) such as the UI 700 to be described below. For example, if the user wishes to have metadata associated with identified objects on expected times objects are to be present at the location but not metadata on expected range of movements of objects at the location, the user may provide input to associate expected times objects are to be present at the location but not metadata on expected range of movements of objects at the location.

Now in reference to FIG. 6, it shows an example user interface (UI) 600 presentable on a display accessible to a device undertaking present principles. The UI 600 includes a prompt 602 that data for building a 3D model has been acquired and requesting user input for whether to build and/or present a 3D model based on the data. A first selector 604 is shown that is selectable by a user to, without further user input, initiate generation of a 3D model and to tag objects for the model with metadata as discussed herein. A second selector 606 is shown that is selectable by a user to, without further user input, initiate generation of a 3D model hut not tag objects for the model with metadata as discussed herein (or, e.g., at least not until a subsequent user command to do so). A third selector 608 is shown that is selectable by a user to, without further user input, cause the device to decline to initiate generation of a 3D model (e.g., at least until a later time but while also storing the data for building the model at a later time).

Moving on, reference is now made to FIG. 7. It shows an example user interface (UI) 700 presentable on a display for configuring 3D models in accordance with present principles. The UI 700 may be presentable on the device at any time during 3D model generation and presentation. The UI 700 includes a first portion 702 for selecting which of various 3D model modes to use when presenting a 3D model. Each respective mode is selectable via the respective check boxes shown next to them to, without further user input, enable the mode and cause a 3D model to be presented accordingly. The UI 700 indicates a first mode 704 titled "original mode" in which all objects, including transient and mobile objects, that are identified are shown in the original mode version of the 3D model in their last known state and/or position within the location as they were in when images of them were acquired for building the 3D model.

The UI 700 may also indicate a second mode 706 for selection in which mobile and permanent objects, but not transient objects, identified from data used to generate the 3D model are shown in their last known state and/or position within the location that they were in. However, in other embodiments for this mobile and permanent mode, transient, objects are not presented only if estimated to no longer be present at time such a version of the 3D model will be presented, which may have beers determined using the data table 500.

In addition to the foregoing, the UI 700 may indicate a third mode 708 for selection in which permanent objects (e.g., structures such as walls, floors, ceilings, stairs, etc.), but not transient and mobile objects, are shown in the permanent mode version of the 3D model. A fourth mode 710 may also be available for selection for presenting a 3D model of a location in its real time condition and/or state (or at least substantially real time depending on device processing capabilities) such that objects are shown in the 3D model in places within the location at which they are currently actually located at the location itself. Real time mode 710 may be made possible owing to, e.g., a real-time video feed of the location from a webcam that is transmitted to the device.

Even further, in some embodiments a future time prediction mode 712 may be indicated on the UI 700 that is selectable to present a version of a 3D model in which objects are presented in places within the location that they are predicted to be at in the future (e.g., based on their predetermined range of movement and/or a user-specified time frame), and/or to present a version of a 3D model in which objects are manipulable within the 3D model by a user so that they may be represented in different places from where initially identified. Thus, future time prediction mode 712 may in one sense be thought of as a 3D model editing mode in which identified objects may be manipulated and modified (e.g., manipulating and modifying location and appearance). Objects may be dragged and moved within the 3D model from one place to another, may have their color and size changed, may have portions thereof removed or redacted so as to hide personal and/or confidential information, etc. In any case, it is to be understood that when mode 712 is selected, modes 706 find 708 may be selectable too, so that editing may be performed for mobile and permanent objects (mode 706) or just for permanent objects (mode 708). In some embodiments, editing may even be performed on a version of the 3D model initially presented in original mode so that, after being presented, transient objects may also be moved from their initial position.

Still in reference to FIG. 7, the UI 700 may include still other options as well, including a second option 714 that is selectable using the radio button shown next to it. Option 714 is selectable to replace digital images of objects (e.g., as gathered by a camera) with icons of objects of the same object type as the objects having their images replaced. Thus, once the radio button shown for option 714 is selected, the option is enabled and one or more sub-options may be selected using the respective check boxes that are shown to thus enable icon replacement, including: icon replacement for all objects including transient, mobile, and permanent, objects (sub-option 716), icon replacement for transient objects (option 718), and icon replacement for mobile objects (option 720). As an example, if option 714 is selected and sub-option 720 is selected, an actual image of a chair that was actually disposed at the location may be replaced a generic clip art representation of a chair.

Note that in some embodiments, a sub-option for permanent objects may also be presented so that, once this sob-option is enabled, items such as walls and floors may have their actual colors and textures removed from the 3D model and thus appear more "generic." Furthermore, though also not shown for clarity, the UI 700 may include selectable options and sub-options for the types of metadata (e.g., as discussed above in reference to FIG. 5) to associate with various objects and/or objects of particular classes (e.g., transient, mobile, or permanent).

Figure 8:
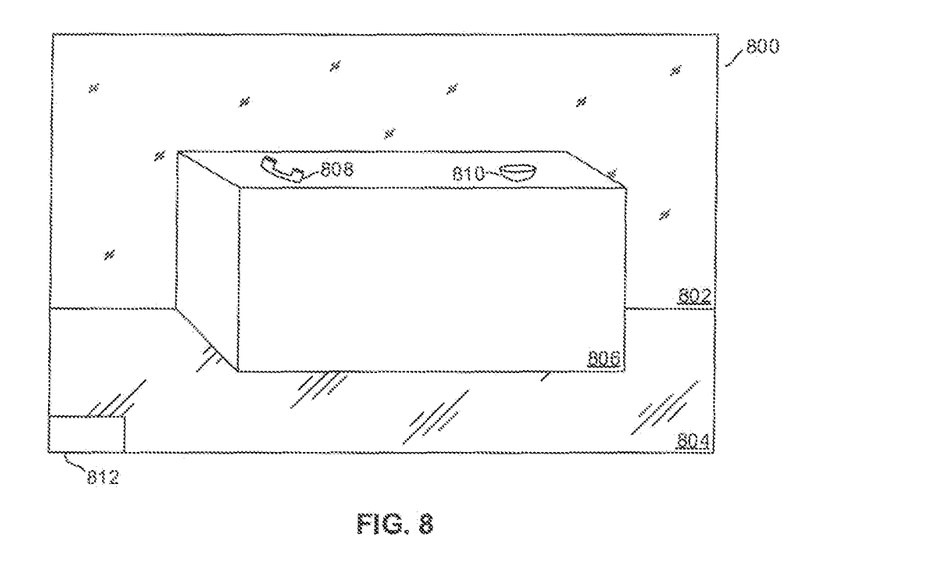
FIGS. 8 and 9 are example diagrams illustrating present principles.
Figure 9:
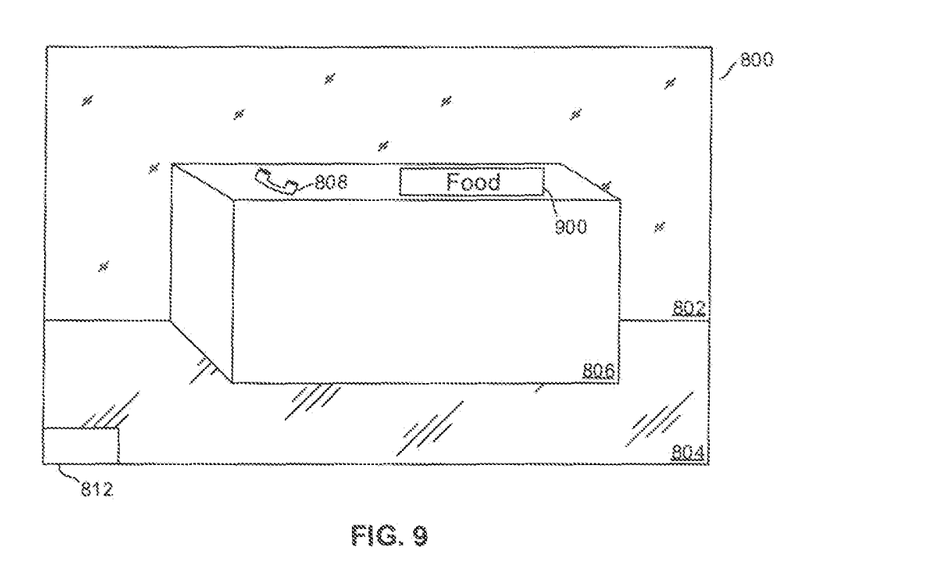

Cross-reference is now made to FIGS. 8 and 9. They show diagrams of an example 3D model 800 as presented on a display. The model 800 includes permanent objects wall 802 and floor 804, as well as mobile objects desk 806 and wireless telephone 808. Both of FIGS. 8 and 9 also show a selector 812 that is selectable by a user to automatically without further user input cause the device to present a UI for configuring the 3D model presentation, such as the UI 700 described above. However, it is to also be understood that in some embodiments, selectors corresponding to elements 704-712 described above and selectable to respectively execute the same functions as described above may be overlaid on a portion of the 3D model 800 (e.g., at a bottom corner of the model 800) so that a user may easily toggle between modes while the 3D model 800 remains presented.

Contrasting FIGS. 8 and 9, FIG. 8 shows an original mode version of the 3D model in which a photograph of a burger 810 is shown in the place it was m when images were gathered from which the 3D model was generated. FIG. 9 shows a future time/edit mode version of the 3D model in which an icon 900 of a food tray has replaced the representation of the burger 810 and is disposed in a slightly different place laterally on the desk 806 closer to the phone 808 based on a user drag and drop to the new location.

It is to be generally understood that when objects are removed, or replaced with icons, in a 3D model as disclosed herein, object clipping techniques (e.g., removing an object based by clipping along its known borders identified during object recognition) and/or 3D model rendering techniques may be used to remove objects and sometimes replace them with others (e.g., icons). For portions of the 3D model that no longer present an object, background objects to be shown where the other object used to be presented may be filled in and/or be more completely shown in the 3D model based on extrapolations of their appearance and/or based on images of the background objects taken from different angles that more completely show the background object without the other object in the way. For icon replacement, 3D icons may be superimposed onto and/or inserted into the 3D model at their appropriate location.

It may now be appreciated that present principles provide for using images taken from different angles to identify various sets of objects within, e.g., a room. By detecting an object from multiple views in the room, a higher confidence can be gamed that an object is at a particular location. A subset of all gathered images taken from different angles may be processed, rather than the entire set, until a predefined confidence level is reached of locations of objects in the room. The predefined confidence may be based on factors such as not defecting 'new' (e.g., additional) objects in a most-recently-analyzed, image of the subset (e.g., where each image of the subset was taken from a different area of the room), processing merely enough images to cover each area in a room X number of times, etc.

After object identification occurs, each object in the room/area may then be inventoried with metadata for future lookup, and/or categorized as temporary, mobile, or permanent. Temporary objects may be those that could easily be removed from their recorded location, such as a laptop, smartphone, food, toys, people, etc. Each temporary object may be assigned a time range of how temporary it is. For example, people in a room would be assigned a range of 1-4 hours since they would likely be gone after that time period. Other temporary objects may be assigned a time range for expected lifetime, if applicable.

Mobile objects may include items that would likely continue to exist in the room but may from time to time be relocated, such as rolling chairs, pens, markers, etc. Mobile objects may be assigned a distance/range of their potential movement in the future. For example, chairs may be expected to be moved within a certain distance of their original position. Multiple ranges may be used for each object, such as ranges for most likely movement versus all potential movement. For example, a chair is likely to remain within a few feet of its original position, but could be moved anywhere in the room where it would fit, and so both ranges may be used.

Non-readily-mobile, semi-permanent, and/or stationary objects such as a mounted projector, mounted TV, a large heavy desk, etc. may be assigned a zero range of movement, although they may be marked as objects that could be removed or replaced with a similar item.

Permanent, objects may include things like walls, ceilings, stairs, and floors. They are typically permanent unless reconstruction occurs. Permanent objects may also be tagged with metadata for their current attributes, which could change over time. For example, walls could change color or texture, and thus may be tagged with such metadata.

Furthermore, in some embodiments, if multiple models have been recorded for a given area/room, they could be used, combined, and compared to change the time of expected existence a temporary object, distance to a mobile object, etc.

Regardless, after objects, are identified and classified, they can later be used for viewing in a 3D model. The user can opt to view the model in different modes to see different classes of objects. The modes discussed herein thus allow the user to view the room in different ways.

Providing an example, a real estate agent or homeowner may show their home using a 3D model generated in accordance with present principles with generic iconized equivalents of furniture in their house. The homeowner wouldn't have to remove toys or items on their countertops when taking pictures since these items may be removed from the model itself owing to being, e.g., temporary or mobile.

As another example, a company could generate 3D models of its buildings and share different levels of detail depending on access levels for different employees. Thus, models in this example could be automatically "cleaned up" for various users to remove laptops, people, text with confidential information, etc.

Present principles could be applied in other examples as well, such as Marines entering a building, police entering a house, etc. Streets and buildings could also be modeled with people and cars removed.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular ASSOCIATION OF OBJECTS IN A THREE-DIMENSIONAL MODEL WITH TIME-RELATED METADATA is herein shown and described in detail, it is to be understood that, the subject matter which is encompassed by the present application is limited only by the claims.

What is claimed is:

1. A device, comprising:
at least one processor;
a camera accessible to the at least one processor; and
storage accessible to the at least one processor and bearing instructions executable by the at least one processor to:
receive at least one image from the camera;
based at least in part on the at least one image from the camera, establish a three-dimensional (3D) model of at least a portion of a location shown in the at least one image, the 3D model being different from the location itself that is shown in the at least one image;
identify at least one object shown in the at least one image from the camera; and
associate the at least one object shown in the at least one image with time-related metadata;
wherein the time-related metadata comprises metadata regarding the permanence of the at least one object; and
wherein the instructions are executable by the at least one processor to:
determine that the at least one object is a permanent object; and
represent the at least one object in the 3D model at least in part based on the determination.

2. The device of claim 1, wherein the time-related metadata comprises metadata regarding a likelihood that the at least one object will be located at a different place at a future time than as represented in the model.

3. The device of claim 1, wherein the at least one object is a first object, and wherein the instructions are executable by the at least one processor to:
determine that a second object is a transient object; and
decline to represent the second object in the 3D model at least in part based on the determination that the second object is a transient object.

4. The device of claim 1, wherein the at least one object is a first object, and wherein the instructions are executable by the at least one processor to:
determine that a second object is a readily-mobile object; and
decline to represent the second object in the 3D model at least in part based on the determination that the second object is a readily-mobile object.

5. The device of claim 1, wherein the at least one object is a first object, and wherein the instructions are executable by the at least one processor to:
determine that a second object is an at least semi-permanent object; and
represent the second object in the 3D model at least in part based on the determination that the second object is an at least semi-permanent object.

6. The device of claim 1, wherein the instructions are executable by the at least one processor to:
access a database at which data is stored that respectively associates types of objects with time-related metadata; and
associate the at least one object with time-related metadata based at least in part on data in the database.

7. A method, comprising:
generating a three-dimensional (3D) model of an area;
determining whether objects recognized from the area are transient in the area;
associating the objects recognized from the area with metadata related to whether the objects are transient in the area; and
based on determining that at least a first object from the area is not transient, including a representation of the first object in the 3D model, the determining that the first object is not transient being based at least in part on identifying a first object type for the first object;

wherein the determining that the first object from the area is not transient is performed at least in part by processing metadata associated with the first object type from a database that associates respective object types with metadata related to whether objects of the respective object type are transient.

8. The method of claim 7, wherein the method comprises: responsive to receiving input from a user to show, in the 3D model, representations of objects from the area that are transient, including in the 3D model representations of objects from the area that are transient and presenting the 3D model on a display.

9. The method of claim 7, wherein the method comprises: responsive to receiving input from a user to not show, in the 3D model, representations of objects from the area that are transient, presenting the 3D model on a display without showing representations of objects from the area that are transient.

10. The method of claim 7, comprising: based on determining that at least a second object from the area is transient, declining to include a representation of the second object in the 3D model.

11. The method of claim 10, comprising: determining that the second object from the area is transient at least in part by processing metadata from a database that associates respective object types with metadata related to whether objects of the respective object type are transient.

12. The device of claim 1, wherein the at least one the object is associated with time-related metadata based on a comparison of images that are generated at different times.

13. The device of claim 1, wherein the establishing of the 3D model and the associating of the at least one object is performed responsive to receipt of user input directed to a selector presented on a user interface (UI), the UI presented on a display.

14. The method of claim 7, wherein the generating of the 3D model and the associating of the objects is performed responsive to receipt of user input directed to a selector presented on a user interface (UI), the UI presented on a display.

15. A device, comprising:
at least one computer readable storage medium that is not a transitory signal, the computer readable storage medium comprising instructions executable by at least one processor to:
generate a three-dimensional (3D) model of an area;
determine whether objects recognized from the area are transient in the area;
associate the objects recognized from the area with metadata related to whether the objects are transient in the area; and
based on determining that at least a first object from the area is not transient, include a representation of the first object in the 3D model, the determining that the first object is not transient being based at least in part on identifying a first object type for the first object;
wherein the determining that the first object from the area is not transient is performed at least in part by processing metadata associated with the first object type from a database that associates respective object types with metadata related to whether objects of the respective object type are transient.

16. The device of claim 15, comprising the at least one processor.

17. The device of claim 16, comprising a camera accessible to the at least one processor, wherein the 3D model of the area is generated based at least in part on at least one image from the camera.

18. The device of claim 15, wherein the instructions are executable to:
responsive to receipt of input from a user to show, in the 3D model, representations of objects from the area that are transient, include in the 3D model representations of objects from the area that are transient and present the 3D model on a display.

19. A method, comprising:
receiving at least one image from a camera;
based at least in part on the at least one image from the camera, establishing a three-dimensional (3D) model of at least a portion of a location shown in the at least one image, the 3D model being different from the location itself that is shown in the at least one image;
identifying at least a first object shown in the at least one image from the camera; and
associating the first object shown in the at least one image with time-related metadata;
wherein the time-related metadata comprises metadata regarding the permanence of the first object; and
wherein the method comprises:
determining that the first object is a permanent object; and
representing the first object in the 3D model at least in part based on the determining.

20. The method of claim 19, comprising:
determining that a second object shown in the at least one image from the camera is a transient object; and
declining to represent the second object in the 3D model at least in part based on the determining that the second object is a transient object.

21. The method of claim 19, comprising:
accessing a database at which data is stored that respectively associates types of objects with time-related metadata; and
associating the first object with time-related metadata based at least in part on data in the database.

22. The method of claim 19, comprising:
in response to receiving user input to show transient and/or mobile objects, showing in the 3D model representations of objects recognized from the area that are determined to be transient and/or mobile in the area.

* * * * *